(12) United States Patent
Guim Bernat et al.

(10) Patent No.: US 10,547,527 B2
(45) Date of Patent: Jan. 28, 2020

(54) APPARATUS AND METHODS FOR IMPLEMENTING CLUSTER-WIDE OPERATIONAL METRICS ACCESS FOR COORDINATED AGILE SCHEDULING

(71) Applicant: Intel Corporation, Santa Clara, CA (US)

(72) Inventors: Francesc Guim Bernat, Barcelona (ES); Kshitij A. Doshi, Tempe, AZ (US); Raj K. Ramanujan, Federal Way, WA (US); Gaspar Mora Porta, Santa Clara, CA (US); Daniel Rivas Barragan, Cologne (DE)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 15/283,314

(22) Filed: Oct. 1, 2016

(65) Prior Publication Data

US 2018/0097743 A1 Apr. 5, 2018

(51) Int. Cl.
*H04L 12/26* (2006.01)
*H04L 29/08* (2006.01)
*H04L 12/911* (2013.01)

(52) U.S. Cl.
CPC .......... *H04L 43/08* (2013.01); *H04L 67/2842* (2013.01); *H04L 69/326* (2013.01); *H04L 47/823* (2013.01)

(58) Field of Classification Search
USPC ....................................................... 709/213
See application file for complete search history.

(56) References Cited

U.S. PATENT DOCUMENTS

| | | | |
|---|---|---|---|
| 8,117,356 B1* | 2/2012 | Narad | H04L 43/0888 709/223 |
| 2005/0091482 A1* | 4/2005 | Gray | H04L 41/5058 713/151 |
| 2006/0149840 A1* | 7/2006 | Thompson | H04L 45/24 709/224 |
| 2008/0294644 A1* | 11/2008 | Liu | G06F 16/335 |
| 2012/0317274 A1* | 12/2012 | Richter | G06Q 10/06 709/224 |

(Continued)

*Primary Examiner* — Hermon Asres
(74) *Attorney, Agent, or Firm* — Nicholson De Vos Webster & Elliott LLP

(57) ABSTRACT

Apparatus, methods, and system for implementing cluster-wide operational metrics access for coordinated agile scheduling. One embodiment of the apparatus includes a memory to store instructions; a processing circuitry to execute instructions; and an interface circuitry. The interface circuitry to provide metrics associated with the apparatus to one or more subscriber nodes or network components in a managed cluster and to subscribe, via a metrics subscription request, to receive from one or more publisher nodes or network components in the managed cluster, metrics associated with the one or more publisher nodes or network components. The metrics to be stored in a dedicated location of the memory. The provision and subscription of metrics may be made using new protocols added to Layer 4 or transport layer of a network communication model and/or over a dedicated communication channel. The dedicated communication channel may be of low bandwidth with fixed priority and deterministic latency.

22 Claims, 15 Drawing Sheets

(56) References Cited

U.S. PATENT DOCUMENTS

2013/0054966 A1* 2/2013 Clay .................... H04L 9/3273
713/168
2014/0067940 A1* 3/2014 Li .......................... H04L 67/22
709/204

* cited by examiner

APPARATUS AND METHODS FOR IMPLEMENTING CLUSTER-WIDE OPERATIONAL METRICS ACCESS FOR COORDINATED AGILE SCHEDULING

BACKGROUND INFORMATION

As digital storage solutions become more capable and affordable, large and complex sets of data are being collected and processed to provide useful analytics for solving a variety of issues, issues that range from predicting human behavior to forecasting natural disasters. These collected data, often referred to as big data, comprise data sets so large and complex that traditional data processing tools are simply inadequate to deal with them. Thus, it is increasingly common, if not absolutely necessary, to rely on the power of parallel computing found in large scale multi-machine systems to solve problems spanning big data sets. This is because most single-machine solutions simply lack the necessary memory and/or computational resources to produce results in a timely manner. In many emerging applications of large scale processing clusters, the data being produced, updated, and analyzed are likely to involve high degrees of complex linkages. For example, it is not uncommon for records to have tens of thousands of potential attributes each or for graphs to have vertex degrees that follow a power law distribution. To effectively process large amounts of such data, datacenters and processing clusters are employing hundreds and thousands of computers linked by low-latency, high bandwidth interconnection fabrics.

The efficiency, timeliness, and effectiveness of large scale clustered solutions depend critically on the smart distribution of data and tasks across a multitude of resources in the cluster. This means that it is crucial to ensure loads are dynamically balanced and distributed, both proactively and reactively, so that the cluster can continuously adapt to link (e.g., switch or hub) saturations, as well as quickly adjust to compensate for machine failures. As clusters grow larger in size and the communication patterns becoming more data and problem dependent, three needs arise: (a) the timely discovery and notification of failures and imbalances occurring in the cluster, (b) the ability to responsively adjust computational and communicational scheduling at microsecond granularities in a distributed manner, and (c) the coordination among the many distributed hosts and internetworking machinery to collectively carry out a task.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
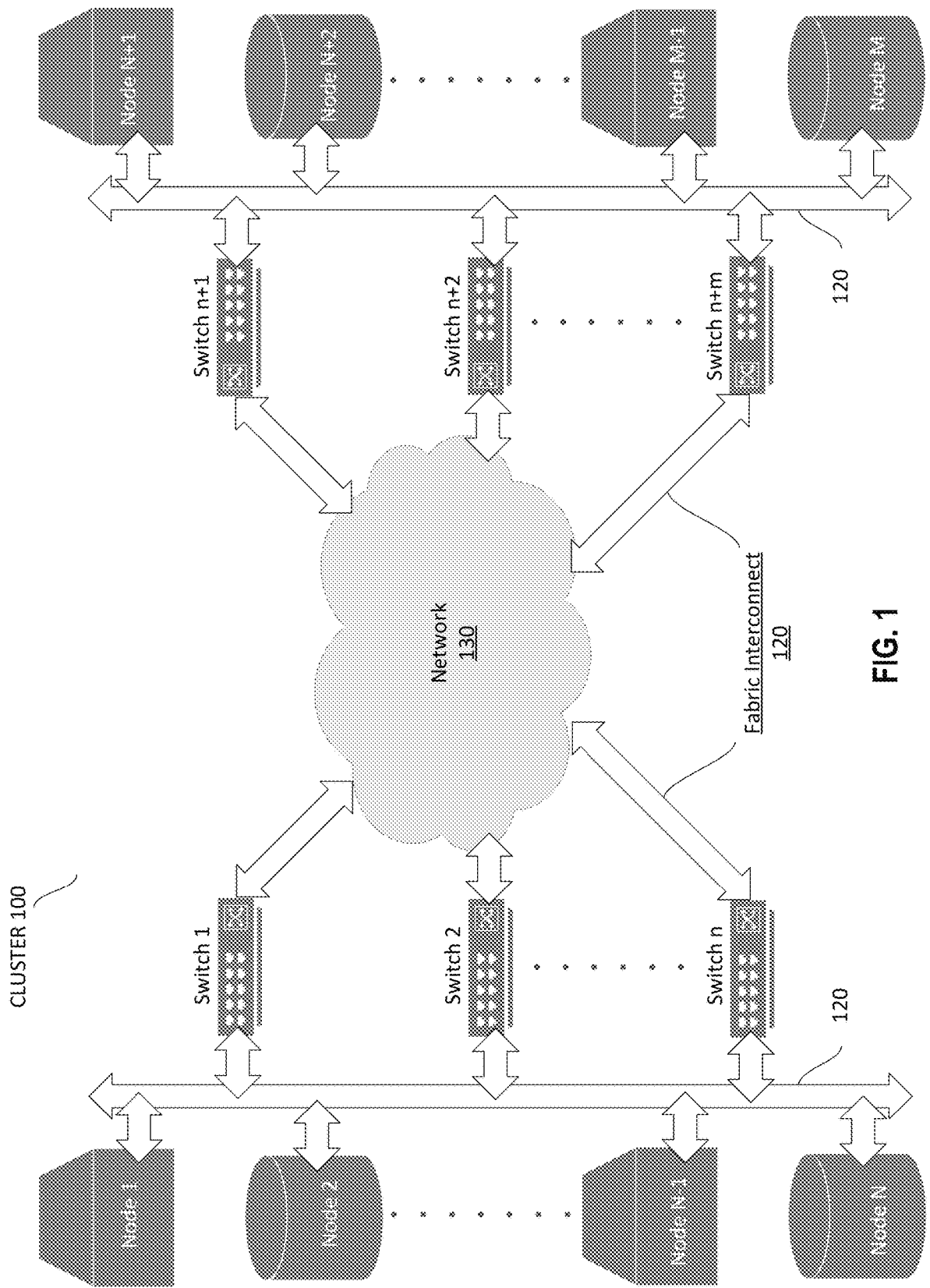
FIG. 1 illustrates an exemplary infrastructure of a cluster solution on which embodiments of the present invention may be implemented.

Embodiments apparatus and methods for implementing cluster-wide operational metrics access for coordinated agile scheduling are described herein. In the following description, numerous specific details are set forth to provide a thorough understanding of embodiments of the invention. One skilled in the relevant art will recognize, however, that the invention can be practiced without one or more of the specific details, or with other methods, components, materials, structures, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

As digital storage solutions become more capable and affordable, large and complex sets of data are being collected and processed to provide useful analytics for solving a variety of issues, issues that range from predicting human behavior to forecasting natural disasters. These collected data, often referred to as big data, comprise data sets so large and complex that traditional data processing tools are simply inadequate to deal with them. Thus, it is increasingly common, if not absolutely necessary, to rely on the power of parallel computing found in large scale multi-machine systems to solve problems spanning big data sets. This is because most single-machine solutions simply lack the necessary memory and/or computational resources to produce results in a timely manner. In many emerging applications of large scale processing clusters, the data being produced, updated, and analyzed are likely to involve high degrees of complex linkages. For example, it is not uncommon for records to have tens of thousands of potential attributes each or for graphs to have vertex degrees that follow a power law distribution. To effectively process large amounts of such data, datacenters and processing clusters are employing hundreds and thousands of computers linked by low-latency, high bandwidth interconnection fabrics.

The efficiency, timeliness, and effectiveness of large scale clustered solutions depend critically on the smart distribution of data and tasks across a multitude of resources in the cluster. This means that it is crucial to ensure loads are dynamically balanced and distributed, both proactively and reactively, so that the cluster can continuously adapt to link (e.g., switch or hub) saturations, as well as quickly adjust to compensate for machine failures. As clusters grow larger in size and the communication patterns becoming more data and problem dependent, three needs arise: (a) the timely discovery and notification of failures and imbalances occurring in the cluster, (b) the ability to responsively adjust computational and communicational scheduling at microsecond granularities in a distributed manner, and (c) the coordination among the many distributed hosts and internetworking machinery to collectively carry out a task.

Aspects of the present invention provide simple and efficient solutions to achieve distributed load balancing for a cluster of machines connected by fabrics that can respond quickly to issues pertaining to resource overload, congestion, and disruption. Embodiments described herein apply to cluster solutions, datacenters as well as managed clouds that support enterprise database, big data, and/or technical computing workloads. One aspect of the present invention extends node, network component, and fabric infrastructures to create a cluster nodes that, from the perspective of an operating system or a software, allows any module/component on any node to readily refer to any other node in the cluster, by simply reading any meaningful metric available at the cost of a cacheable load instruction. In order to maintain and update the metrics in an efficient and timely manner, one aspect of the invention provides that each metric is associated with the appropriate time labeling or timestamp so that old metrics automatically ages out. This ensures that the disruptions to nodes and network components in the cluster are automatically reflected based on updates to various metrics, or the lack thereof. For instance, if a metric ages out without being replaced by a more recent or updated metric, this serves to indicate that there may be disruptions in the node or network component which provides the metric. Another aspect of the invention focuses on utilizing hardware to process and provide metrics in a way that is transparent to the consumer of the metrics (e.g., the operating system or software).

At a high level, aspects of the present invention are implemented through making hardware extensions to components of a typical cluster solution or clustered computing system. Together, these extensions to hardware provide the capability that when operating together, gives the operating system and software running on any node in the cluster a direct view of the state of other node in the same cluster.

According to an embodiment, the L4 or transport layer of the network communication model (e.g., Layer 4 of the OSI model) used by the cluster is extended with a set of protocols (i.e. L4 protocols) for subscribing and de-subscribing metrics. In addition, the L4 protocols may be used by metric producers or publishers to both inform other nodes about the metrics the producers and publishers can provide, as well as to furnish such metrics to the subscribers by unicasting or multicasting the metrics to them over the fabric. Metrics information streaming via this L4 protocol can be parsed by hardware circuitry, software, firmware, or any combination thereof. The fabric referred to here is a Multi-node tightly coupled or distributed system that comprises one or more coherent domains. Each of the coherent domains is connected to other coherent domains through a fabric interconnect. Examples of a fabric include High-Performance Computing (HPC) clusters and data centers having servers communicating with one another over fabric. According to the embodiment, the L4 protocol flows are used by entities on the fabric (i.e. fabric entities) to subscribe and de-subscribe to metrics that are of interest to them. Examples of fabric entities include nodes, computing/storage resources, and networking components in the fabric. With the L4 protocol flows, any fabric entity can send a query operation to other fabric entities, or to a centralized metrics map service, to learn about the metrics that are available from the other fabric entities. A fabric entity may also send a metrics subscription request, through its fabric interface (FI), or the host fabric interface (HFI) in some nodes, to indicate to other fabric entities that it is interested in subscribing to specific metrics, such as the average load or queue depth, published by the other entities. Metrics subscription may be done at any time. According to an embodiment, an entity subscribes to a matric by providing a unique metric ID to the entity publishing the metric. The metric ID is defined and bound to each entity type. For example, the metric AverageLoad may be a switch-specific metrics that is only available from a network component, while the metric of average processing time may be something that is specifically bound to processing nodes. A standards specification may be implemented to provide a set of common metrics to improve compatibility across different providers, systems, software stacks, and hardware configurations.

According to an embodiment, the entity receiving and processing the metrics subscription request may decide whether to accept or reject the request. Typical reasons for a metrics publishing entity to not accept the subscription request of another entity include (a) the metric does not exist for the publishing entity; (b) there is not enough resources for the publishing entity to fulfill the subscription request (e.g., the subscription data repository is full); (c) the requested metric is not published due to policy decision. According to an embodiment, two registration options are supported. For one, the requesting/subscribing entity may unicast a metrics subscription request to a single metrics publishing entity. Alternatively, the requesting/subscribing entity may multicast a subscription request to multiple fabric entities in the cluster to subscribe to them all at once with a single subscription request. It is worth noting that subscription requests are rare operation in comparison with the delivery or streaming of subscribed metrics data following the subscription. As such, the software or firmware components at the metrics publishing entities may control how much metrics information they wish to supply. What this means is that the subscribing entity may only get the metrics that the publishing entity is designed to or have the capacity to provide. For example, setting a low capacity limit ensures that the bandwidth provided by a particular channel is not overloaded and can sustain desired peak metrics delivering rates.

In an embodiment, the fabric is extended to provide a separate, dedicated channel for conveying the subscribed metrics. This dedicated channel may be physical or virtual, designed for low bandwidth with fixed priority and deterministic latency. Such separate and dedicated channel minimizes interaction and/or contamination likely to occur between the metrics stream and other traffics. In addition, the dedicated channel may provide debugging and alerting mechanisms that can be used in the event that the fabric is suffering from congestions, disruptions or reliability issues. The size and requirements of the dedicated channel may be tailored to fit the requirements of metric publications or streams, at the same time allowing for many customizations and optimizations. For example, the dedicated channel may support only 64 byte of payload while using a non-reliable communication protocols with no need for re-transmission.

In an embodiment, each node, resource, or network component in the fabric includes a hardware logic known as the fabric interface (FI). The FI not only supports communications between different nodes or entities in the cluster/fabric, it also handles functions such as metrics subscription, de-subscription, and publication. According to some embodiments, the FI produces, sends, and routes metrics information to the subscribing entities, as well as processing the incoming metrics and storing them directly to the main memory via a direct memory access (DMA). As such, the architecture of the nodes, resources, and network components are extended to provide access to address space in the main memory used for storing the incoming metrics. According to an embodiment, a directory or topology service is envisioned. The directory/topology service may build a catalog of all available metrics from each entity that advertises or publishes the metrics that it can furnish to others. The director/topology service may also record and supply network topology to software modules looking to identify the structure of the cluster.

FIG. 1 illustrates an exemplary infrastructure on which embodiments of the present invention may be implemented. The cluster solution 100 comprises a plurality of nodes (Node 1-Node M) and network components (e.g., Switch 1-Switch m) interconnected by fabric interconnects or links 120. A network 130, such as LAN, WAN, etc., which may comprise additional nodes and network components, may also form part of the cluster 100. According to an embodiment, the nodes are computing and/or storage resources in a managed cloud, such as servers, workstations, network attached storage (NAS), etc. In another embodiment, the cluster is a datacenter comprising blade server and storage arrays as nodes. Network components, such as switches, hubs, routers, etc, are used for delivering data and communication between nodes and other networking components in the fabric. The nodes and network components are also known as fabric entities. According to an embodiment, high speed, high throughput communication between the fabric entities are provided by the fabrics such as Intel® Omnipath, Fortville, Red rock canyon, Intel® True Scale infiniband or similar technologies, such as remote direct memory access (RDMA) over Converged Ethernet (RoCE).

Figure 2:
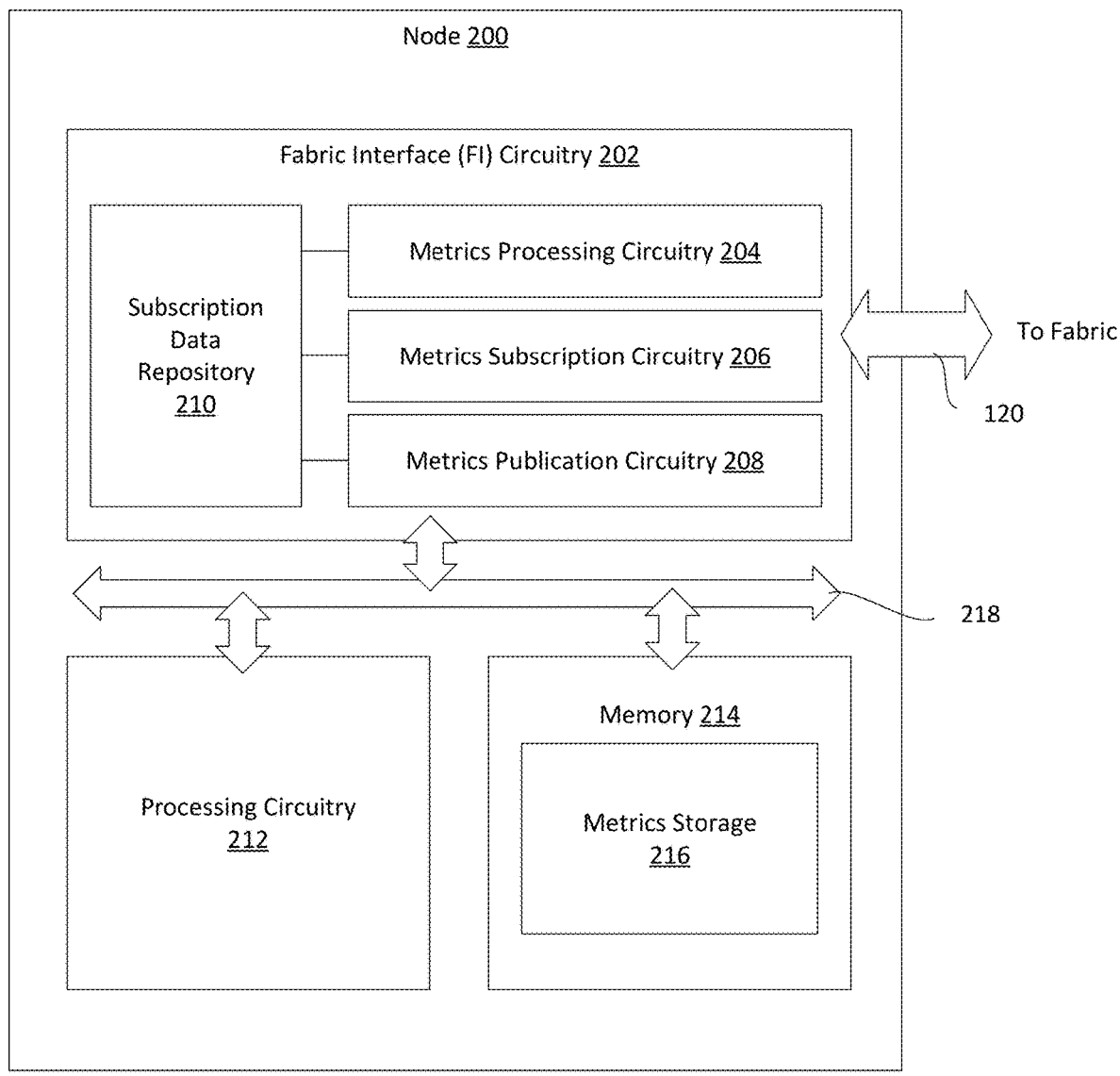
FIG. 2 illustrates an exemplary node in a cluster according to an embodiment.

FIG. 2 illustrates an exemplary node 200 in the cluster solution of FIG. 1. As noted above, the node could be a computing or a storage resource such as a workstation, server, NAS, etc. The node 200 comprises a fabric interface (FI) 202, a processing circuitry 212, and a memory 214. The memory 214, such as system memory, RAM, cache, etc., stores data and instructions to be executed by the processing circuitry 212 (e.g., a central processing unit (CPU)). The FI 502, the processing circuitry 212, and the memory 216 are coupled through an interconnect 218. The FI 502 is further coupled to the fabric through fabric interconnect 120. The FI 502 manages communication for node 200 to and from other fabric entities on the fabric. The FI 502 further comprises a metrics processing circuitry 204, a metrics subscription circuitry 206, and a metrics publication circuitry 208.

The metrics processing circuitry 204 processes incoming metrics and metrics-related messages received by the FI from the fabric interconnect. According to an embodiment, the metrics processing circuitry 204 processes metrics subscription requests sent by other subscribing fabric entities and records the subscription information in the subscription data repository 210. In another embodiment, the metrics processing circuitry 204 preprocesses the subscribed metrics received from other fabric entities before storing the metrics in the metrics storage 216 of the memory 214. In the case of a de-subscribe request, the metrics processing circuitry remove subscription information from the subscription data repository 210.

The metrics subscription circuitry 206 generates subscription requests to other fabric entities and sends them through the FI 202. According to an embodiment, the processing circuitry 212, or a software running in node 200, may determine that it would be beneficial, if not necessary, to obtain certain metric from other fabric entities in order to perform a task. Accordingly, the processing circuitry 212 or the software may signal the metrics subscription circuitry to generate a subscription request to obtain the desired metrics from one or more other fabric entities. A subscription request, according to an embodiment, comprises a metrics ID field for identifying the particular metric desired, an entity ID field for identifying one or more fabric entities from which the desired metrics are to be subscribed, and a physical or a virtual memory address identifying a location within the memory 214 (i.e., metrics storage 216) to which the subscribed metrics are to be stored. In an embodiment, the subscription request further comprises one or more flags for determining whether or not to preprocess the received metrics before storing them to metrics storage 216. For example, a desired metric may be the number of memory channels available on a particular node. However, the metric actually received may be a mask indicating the active and inactive memory channels on the particular node. As such, if the appropriate preprocessing flag is set, a count of the active bits in the flag may be stored to the metric storage 216 instead of the mask itself. In one embodiment, the flag further indicates whether or not to notify a software about a receiving a metric that was requested by the software. According to an embodiment, the details of each subscription request is stored in the subscription data repository 210 and can be queried by the software or other node components to determine what metrics have already been subscribed and from which fabric entities.

The metrics publication circuitry 210 prepares various metrics and sends them to each of the subscribers. According to an embodiment, when a metric is generated and becomes available in node 200, the metrics publication circuitry 210 looks up the metrics subscription repository 210 to find out the subscribers of the metric and responsively send the metric along with any associated information to the subscribers. In one embodiment, the associated information may include a metric ID for identifying the metric, an entity ID for identifying one or more subscribers to which the metrics will be sent, and flags for determining whether the metric should be preprocessed by the metric processing circuitry of the receiving fabric entity. According to an embodiment, the metric ID and entity ID are universal or global IDs within the context of the cluster to uniquely identify each metric type and each entity in the cluster. The metrics may be sent via unicast or multicast protocols. According to an embodiment, the metrics are sent to the subscribers through special protocol implemented over the transport layer (e.g., L4 of the OSI model) of the existing fabric network. In another embodiment, the metrics are delivered to the subscribers over a dedicated cannel, which is implemented with bounded latency for non-bursty and low bandwidth metrics traffic. Such channel may be virtual or physical depending on availability and capability of the network.

In addition to publish metrics to subscribing fabric entities, the metrics publication circuitry 208, according to an embodiment, also periodically publishes the metrics and the frequency with which they are made available, to other fabric entities so that those interested may submit subscription requests to the publishing fabric entity. In another embodiment, all of the published metrics subscription information are sent to a central node and each fabric entity may query the central node to find information on the metrics to which they wish to subscribe. The central node may also provide to each consuming node or potential consuming node the overall topology and metrics availability information by tracking who is publishing what information and who is withdrawing from publishing.

Figure 3:
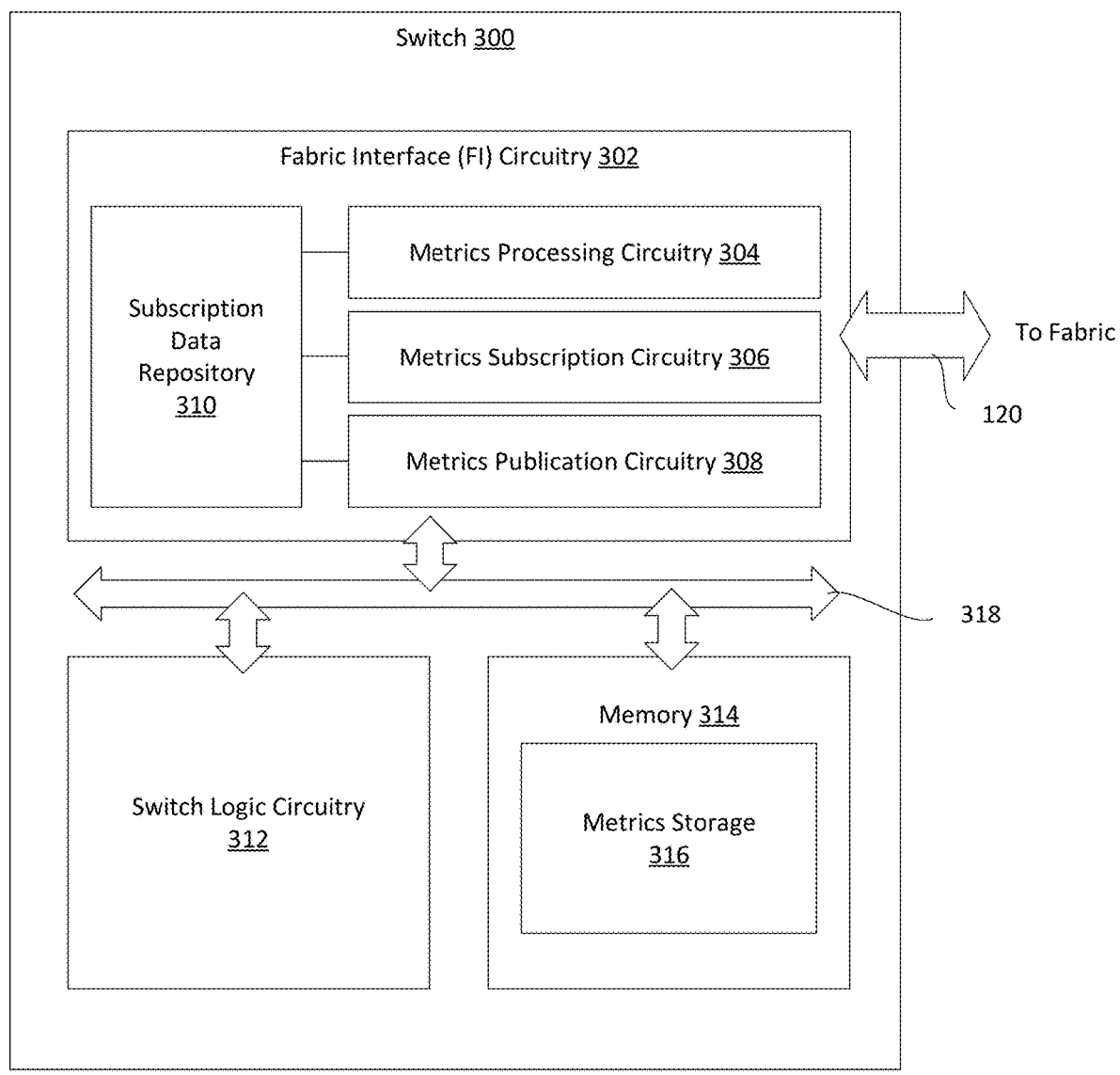
FIG. 3 illustrates an embodiment of a network component of a cluster solution.

FIG. 3 illustrates an embodiment of a network component of a cluster solution. While switch 300 is shown in FIG. 3, a network component could also be implemented as a hub, router, or any other networking device capable of managing the delivery of data and communication to other entities on the fabric. The switch 300 comprises a fabric interface (FI) 302, a switch logic circuitry 312, and a memory 314. The memory 314, such as system memory, RAM, cache, etc., stores networking information used by the switch logic circuitry to perform switch functions. The FI 502, the switch logic circuitry 312, and the memory 314 are coupled through an interconnect 318. The FI 502 is further coupled to the fabric through fabric interconnect 120. The FI 502 manages communication for switch 300 to and from other fabric entities on the fabric. The FI 502 further comprises a metrics processing circuitry 304, a metrics subscription circuitry 306, and a metrics publication circuitry 308.

The metrics processing circuitry 304 processes incoming metrics and metrics-related messages received by the FI from the fabric interconnect. According to an embodiment, the metrics processing circuitry 304 processes metrics subscription requests sent by other subscribing fabric entities and records the subscription information in the subscription data repository 310. In another embodiment, the metrics processing circuitry 304 preprocesses the subscribed metrics received from other fabric entities before storing the metrics in the metrics storage 316 of the memory 314.

The metrics subscription circuitry 306 generates subscription requests to other fabric entities and sends them through the FI 302. According to an embodiment, the switch logic circuitry 312, or software/firmware running in switch 300, may determine that it would be beneficial or necessary, to obtain certain metric from other fabric entities in order to better network switching decisions. Accordingly, the switch logic circuitry 312 or the software/firmware may instruct the metrics subscription circuitry to generate a subscription request to obtain the desired metrics from one or more other fabric entities. A subscription request, as described above, comprises a metrics ID field for identifying the particular metric desired, an entity ID field for identifying one or more fabric entities from which the desired metrics are to be subscribed, and a physical or a virtual memory address identifying a location within the memory 314 (i.e., metrics storage 316) to which the subscribed metrics are to be stored. In an embodiment, the subscription request further comprises one or more flags for determining whether or not to preprocess the received metrics before storing them to metrics storage 316. For example, a desired metric may be the average load metric of the last 10 minutes from surrounding switches. If the appropriate preprocessing flag has been set, as the average load metric information from each of the surround switches arrive, they may be aggregated into a single total running average before being stored in the metric storage 316. Other flags may be used to indicate, for example, whether or not for the metrics processing circuitry 304 to notify the switch logic circuitry 312, or other software/firmware, about the arrival of a requested metric. According to an embodiment, the details of each subscription request is stored in the subscription data repository 310 and can be queried by the software, firmware, switch logic circuitry, as well as other switch components for determining the metrics that has already been subscribed to.

The metrics publication circuitry 310 prepares various metrics pertaining to switch 300 and sends them to the appropriate subscribers. According to an embodiment, when a metric is generated and becomes available in node 300, the metrics publication circuitry 310 looks up the metrics subscription repository 310 to find out the list of subscribers for the metric and responsively send the metric along with any associated information to the subscribing entities. In one embodiment, the associated information may include a metric ID for identifying the metric, an entity ID for identifying one or more subscribers to which the metrics will be sent, and flags for determining whether the metric should be preprocessed by the metric processing circuitry of the receiving fabric entity. The metrics may be sent via unicast or multicast protocols. According to an embodiment, the metrics are sent to the subscribers through special protocol implemented over the transport layer (e.g., L4 of the OSI model) of the existing fabric network. In another embodiment, the metrics are delivered to the subscribers over a dedicated cannel, which is implemented with bounded latency for non-bursty and low bandwidth metrics traffic. Such channel may be virtual or physical depending on availability and capability of the network.

In addition to publish metrics to subscribing fabric entities, the metrics publication circuitry 308, according to an embodiment, also periodically publishes the metrics and the frequency with which they are made available, to other fabric entities so that those interested may submit subscribe accordingly. In another embodiment, all of the published metrics subscription information are sent to a centralized metrics map service running on one of the fabric entities. Each fabric entity may query the centralized metrics map service to find which of the entities provide the metrics they desire. The centralized metrics map service may also make available the overall topology and metrics availability information based on all of the metrics publications it receives.

According to an embodiment, after subscribing to the desired metrics from a publishing fabric entity, the consumers of the metrics within the subscribing entity, such as the processing circuitry 212, switch logic circuitry 312, software, firmware, or any other node/switch component, may access the subscribed metrics directly from the metrics storage area (e.g., 216 and 316) of the memory. This eases the burden on the consumer as they do not need to specifically make a request one or more other entity each time they need a particular metric. Rather, the consumers of the metrics need only to subscribe once and subsequent metrics will be delivered automatically to a memory region they can directly access.

Figure 4:
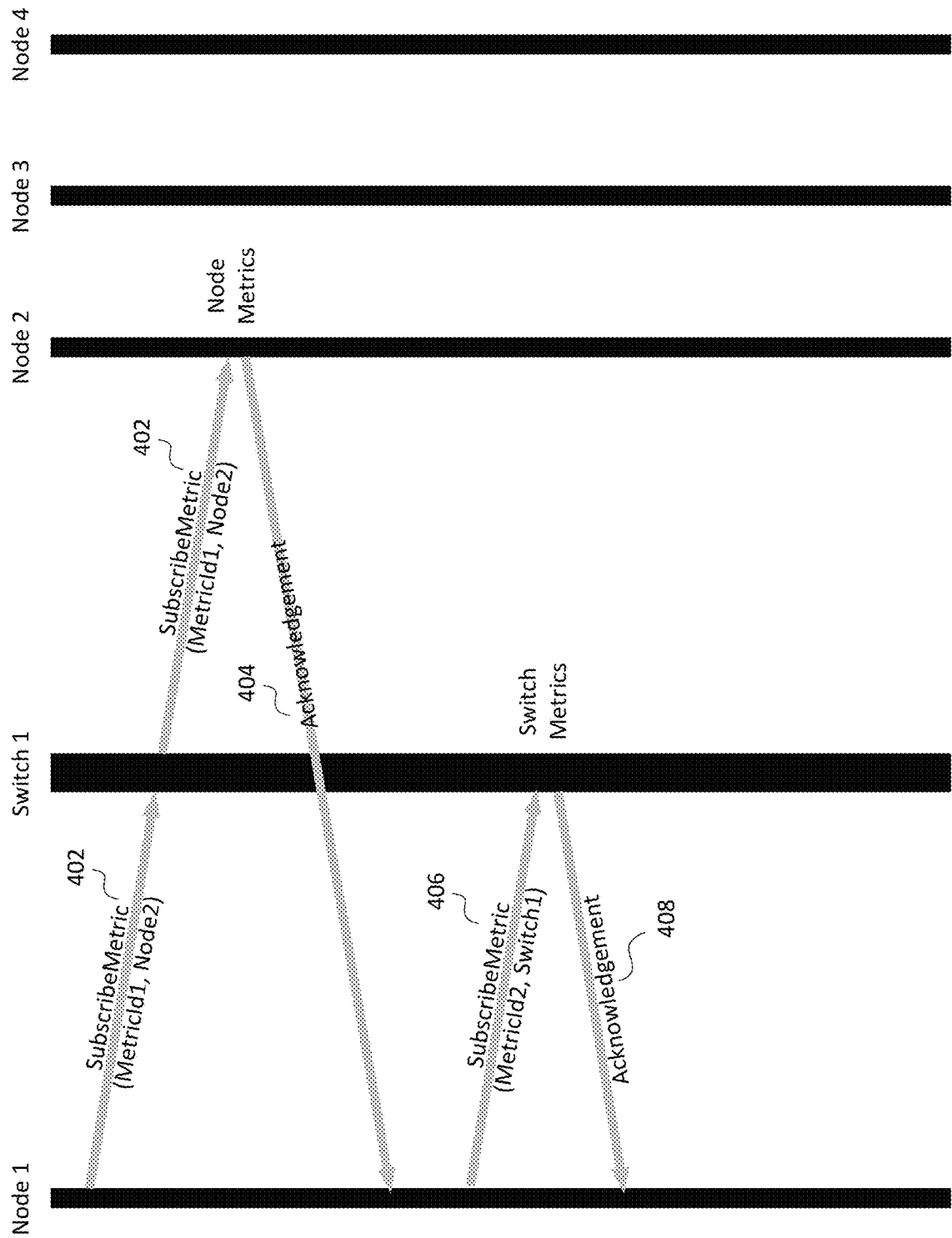
FIG. 4 illustrates an exemplary access sequence for making a metrics subscription request according to an embodiment.

FIG. 4 illustrates an exemplary access sequence for making a metrics subscription request according to an embodiment. In FIG. 4, Node 1 wishes to subscribe to a particular node metric published by Node 2. As such, Node 1 sends a metrics subscription request 402 to Node 2. The metrics subscription request 402 comprises the metric ID of the metric desired (i.e., "MetricID1") and the entity ID of the fabric entity (i.e., "Node2") from which to subscribe the desired metric. The metrics subscription request 402 first arrives at Switch 1. Switch 1 performs the appropriate switching functions and forwards the metrics subscription request 402 onto Node 2. Alternatively, if Node 1 and Node 2 are directly connected, the metrics subscription request 402 may be sent from Node 1 to Node 2 directly without going through Switch 1. After receiving and processing the metrics subscription request 402, Node 2 may optionally return an acknowledgment 404 back to Node 1.

In additional to node metrics, Node 1 may also desire to subscribe to switch metrics published by Switch 1. Similar to registering for a node metric, Node 1 sends a metric subscription request 406 to Switch 1. The metrics subscription request 406 comprises the metric ID of the metric desired (i.e., "MetricID2") and the entity ID of the fabric entity (i.e., "Switch1"). After receiving and processing the metrics subscription request 406, Switch 1 may optionally return an acknowledgment 408 back to Node 1.

Figure 5:
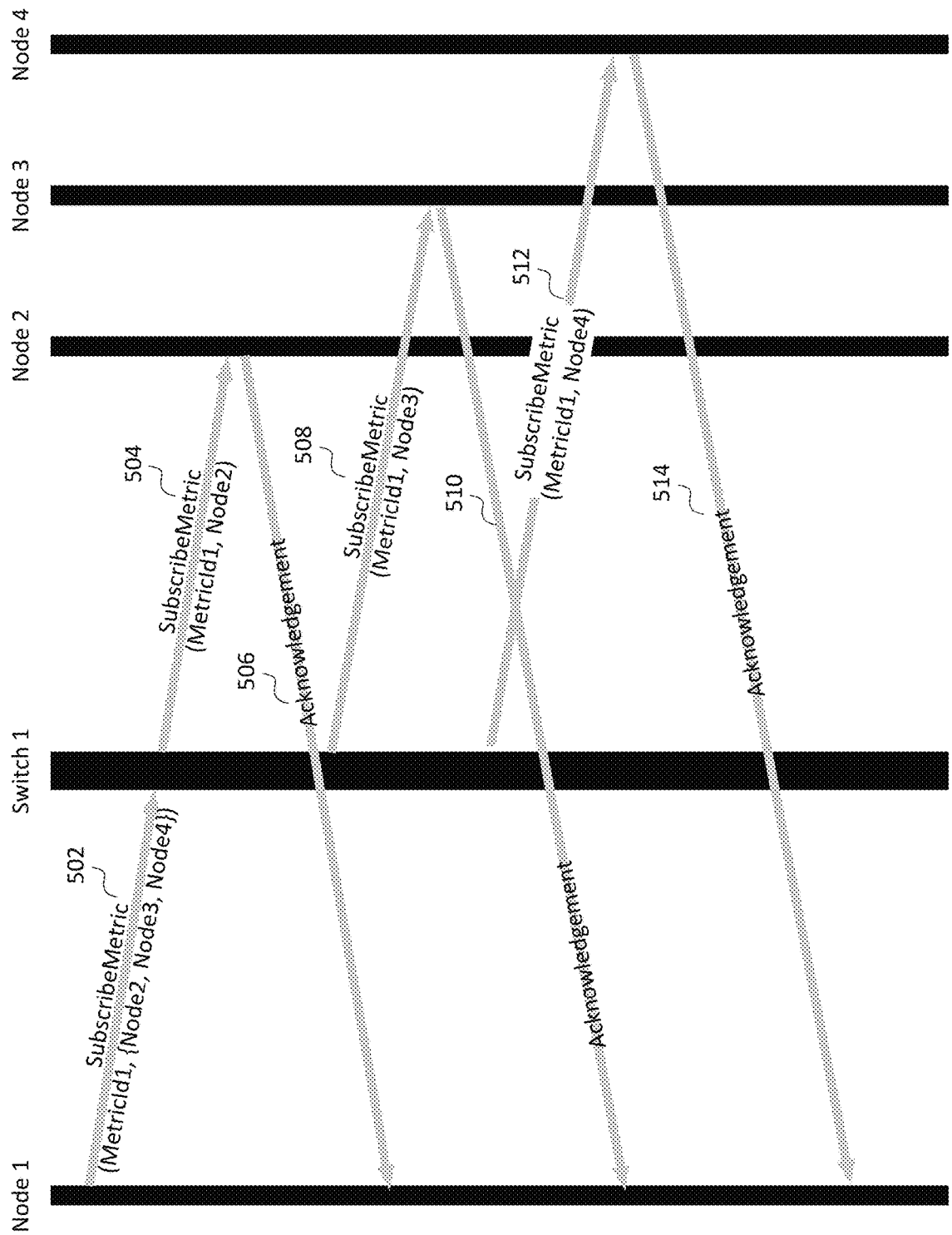
FIG. 5 illustrates an exemplary access sequence for making a metrics subscription request to multiple fabric entities according to an embodiment.

FIG. 5 illustrates an exemplary access sequence for making a metrics subscription request to multiple fabric entities according to an embodiment. In FIG. 5, Node 1 wishes to subscribe to a node metric published by Node 2, Node 3, and Node 4. As such, Node 1 sends a metrics subscription request 502 identifying all of the nodes from which to subscribe the desired metric. The metrics subscription request 502 comprises the metric ID of the metric desired (i.e., "MetricID1") and the entity ID of each of the fabric entities (i.e., "{Node2, Node3, Node4}") from which to subscribe the desired metric. The metrics subscription request 502 first arrives at Switch 1. Switch 1 processes the metrics subscription request 502 and performs the appropriate switching functions by forwarding metrics subscription requests 504, 508, and 512 respectively onto Node 2, Node 3, and Node 4. Alternatively, Switch 1 may simply forward the same metrics subscription request 502 to Node 2, Node 3, and Node 4. After receiving and processing the metrics subscription request from Node 1, Each of Nodes 2, 3 and 4 may optionally return an acknowledgment (i.e., 506, 510, and 514) back to Node 1.

Figure 6:
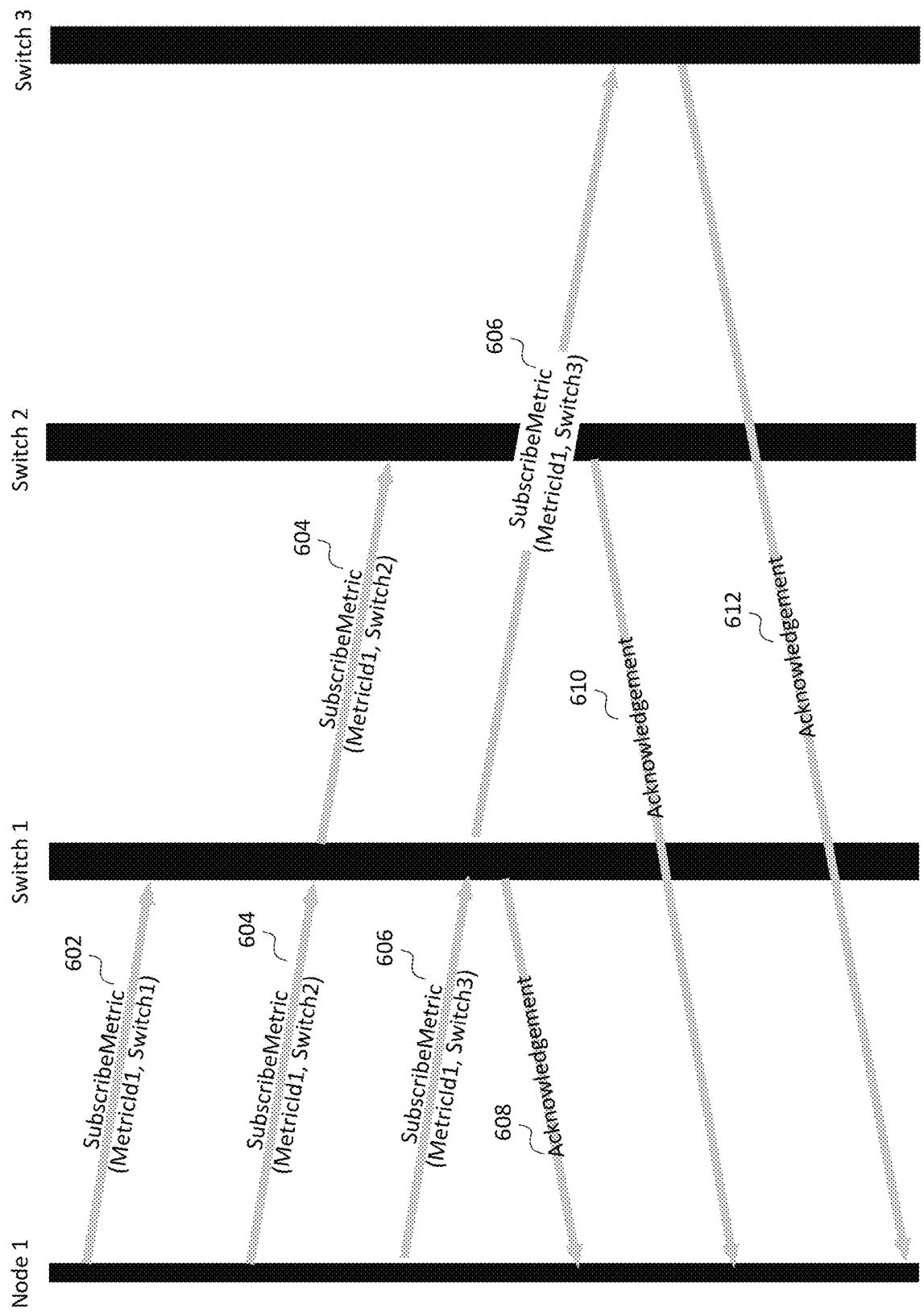
FIG. 6 illustrates an exemplary access sequence for making metrics subscription requests from a node to multiple switches, according to an embodiment.

FIG. 6 illustrates an exemplary access sequence for making metrics subscription requests from a node to multiple switches, according to an embodiment. In FIG. 6, Node 1 wishes to subscribe to a switch metric published by Switch 1, Switch 2, and Switch 3. As such, Node 1 sends a respective metrics subscription request 602, 604, and 606 to each of Switches 1, 2, and 3. Each of the metrics subscription requests identifies a corresponding switch from which to subscribe the desired metric. The metrics subscription requests 602, 604, and 606 first arrive at Switch 1. Since request 602 is directed at Switch 1, Switch 1 processes the metrics subscription request 602 and stores the subscription information in its subscription data repository. Switch 1 then returns an optional acknowledgement 608 indicating successful subscription back to Node 1. With respect to metrics subscription requests 604 and 606, Switch 1 performs the appropriate switching function and forwards these requests respectively to Switch 2 and Switch 3. Upon successfully processing the request and recording the subscription information in their respective subscription data repositories, Switches 2 and 3 returns optional acknowledgements 610 and 612 back to Node 1.

Figure 7:
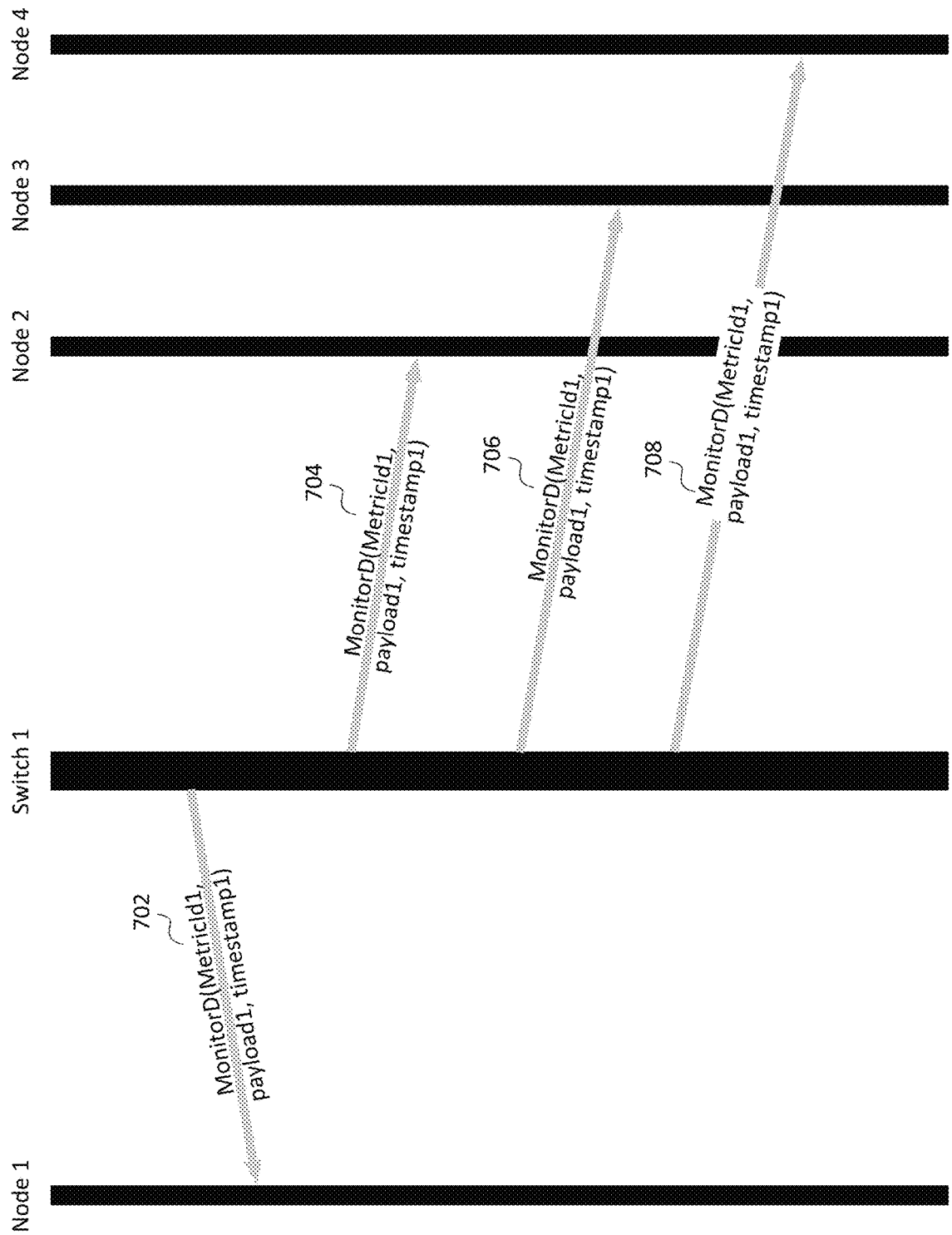
FIG. 7 illustrates an access sequence for delivering metrics to metric subscribers via a broadcast, according to an embodiment.
Figure 8:
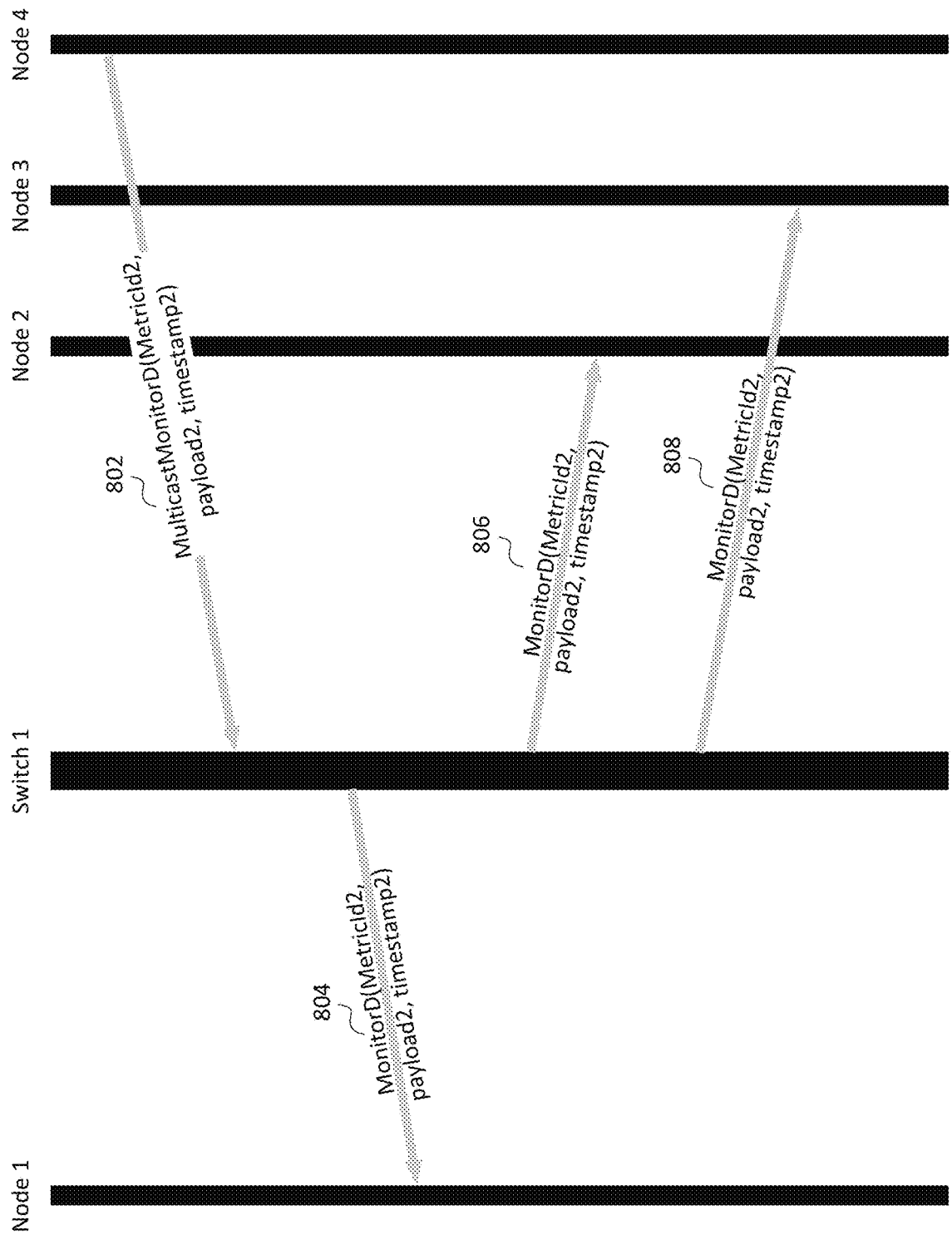
FIG. 8 illustrates an access sequence for delivering metrics to metric subscribers via multicast, according to an embodiment.

FIGS. 7 and 8 illustrate different access sequence for sending metrics information from one publishing entity to one or more subscribing entities in the cluster. Multicasting should be used whenever and wherever available to simplify and reduce the traffic to multiple subscribers. The metrics information is expected to be generated periodically and marked by a timestamp, which should be sufficiently covered by using just a few bits. The metrics information is propagated at a low priority but predictable regularity so that while an operating system or software on a subscribing entity may use older information in making routing or load balancing decisions, they know that the information is guaranteed not to be older than a predetermined threshold.

FIG. 7 illustrates an access sequence for delivering metrics to metric subscribers via a broadcast, according to an embodiment. In FIG. 7, Nodes 1-4 have all previously subscribed to receive a particular metric (i.e., MetricID1) from Switch 1. Upon the particular metric becoming available, the metrics publication circuitry of Switch 1 looks up subscriber information for the particular metric and responsively sends a message (i.e., 702, 704, 706, 708) containing the metric to each of the subscribers of the metric (i.e., Nodes 1-4). The message comprises a metric ID (i.e., "MetricID1) to identify the particular metric that is being delivered in the message payload, a payload (i.e., "payload1") comprising the subscribed metric itself, and a timestamp (i.e., "timestampe1") to identify the time when the metric was generated. Alternatively, Switch 1 may have simply broadcasted the message containing the metric on all of its ports, which resulted in messages 702, 704, 706, 708 going to nodes 1-4.

FIG. 8 illustrates an access sequence for delivering metrics to metric subscribers via multicast, according to an embodiment. In FIG. 8, Nodes 1-3 are all currently subscribed to receive a metric identified by "MetricID2" from Node 4. When MetricID2 becomes available, the metrics publication circuitry of Node 4 looks up the subscriber information associated with MetricID2 and responsively sends a multicast message containing the metric identified by "MetricID2" to Switch 1. The message comprises a metric ID (i.e., "MetricID2) to identify the particular metric that is being delivered in the message payload, a payload (i.e., "payload2") comprising the subscribed metric itself, and a timestamp (i.e., "timestampe2") to identify the time when the metric was generated. According to an embodiment, the multicast message also identifies the recipients that are to receive the message. The multicast message first arrives at Switch 1. Switch 1 processes the multicast message and determines the fabric entities that are to receive the message, either from information in the message itself or by querying Switch 1's subscription repository, and then responsively delivers a message containing the subscribed metric (i.e. 804, 806, 808) to each of the recipients (i.e., Node 1-3).

An embodiment of an apparatus includes: a memory to store instructions; a processing circuitry to execute instructions; and an interface circuitry. The interface circuitry to provide metrics associated with the apparatus to one or more subscriber nodes or network components in a managed cluster and to subscribe, via a metrics subscription request, to receive from one or more publisher nodes or network components in the managed cluster, metrics associated with the one or more publisher nodes or network components. The metrics to be stored in a dedicated location of the memory. The provision and subscription of metrics may be made using new protocols added to Layer 4 or transport layer of a network communication model and/or over a dedicated communication channel. The dedicated communication channel may be of low bandwidth with fixed priority and deterministic latency. The dedicated communication channel may be a virtual channel or a physical channel. The metrics stored in the dedicated location of the memory may be accessible by operating system or software running on the apparatus through a read to the memory. The metrics associated with the apparatus may be provided through a multicast message. The interface circuitry may further publish to a central metrics map service a list of metrics associated with the apparatus. The metrics associated with the apparatus may include a timestamp to indicate when each of the metrics associated with the apparatus was first generated.

An embodiment of a method includes: providing metrics associated with a publishing node or network component to one or more subscriber nodes or network components in a managed cluster; subscribing, via a metrics subscription request, to receive from one or more publisher nodes or network components in the managed cluster, metrics associated with the one or more publisher nodes or network components; and storing the received metrics in a dedicated location of a memory. The provision and the subscription of the metrics may be made using new protocols added to Layer 4 or transport layer of a network communication model and/or over a dedicated communication channel. The dedicated communication channel may be of low bandwidth with fixed priority and deterministic latency. The dedicated communication channel may be a virtual channel or a physical channel. The method may further include accessing the received metrics through a reading of the dedicated location in the memory. The method may further include providing the metrics associated with the publishing node through a multicast message. The method may further include publishing to a central metrics map service a list of metrics associated with the publishing node. Each of the metrics associated with the publishing node may include a timestamp to indicate when each of the metrics associated with the publishing node was first generated.

An embodiment of a system of a plurality of nodes and network components includes: a publishing node or network component to provide to one or more subscriber nodes or network components in the system, metrics associated with the publishing node or network component; and a subscribing node or network component to subscribe, via a metrics subscription request, to receive from one or more publisher nodes or network components in the system, metrics associated with the one or more publisher nodes or network components, the metrics to be stored in a dedicated memory location in the subscribing node or network component. The provision and subscription of metrics may be made using new protocols added to Layer 4 or transport layer of a network communication model or over a dedicated communication channel. The dedicated communication channel may be of low bandwidth with fixed priority and deterministic latency. The dedicated communication channel may be a virtual channel or a physical channel. The metrics stored in the dedicated location of the memory may be accessible by operating system or software running on the subscribing node through a read to the memory. The metrics associated with the publishing node may be provided through a multicast message. The publishing node may further publish to a central metrics map service a list of metrics associated with the publishing node. The metrics associated with the publishing node may include a timestamp to indicate when each of the metrics associated with the publishing node was first generated.

Figure 9:
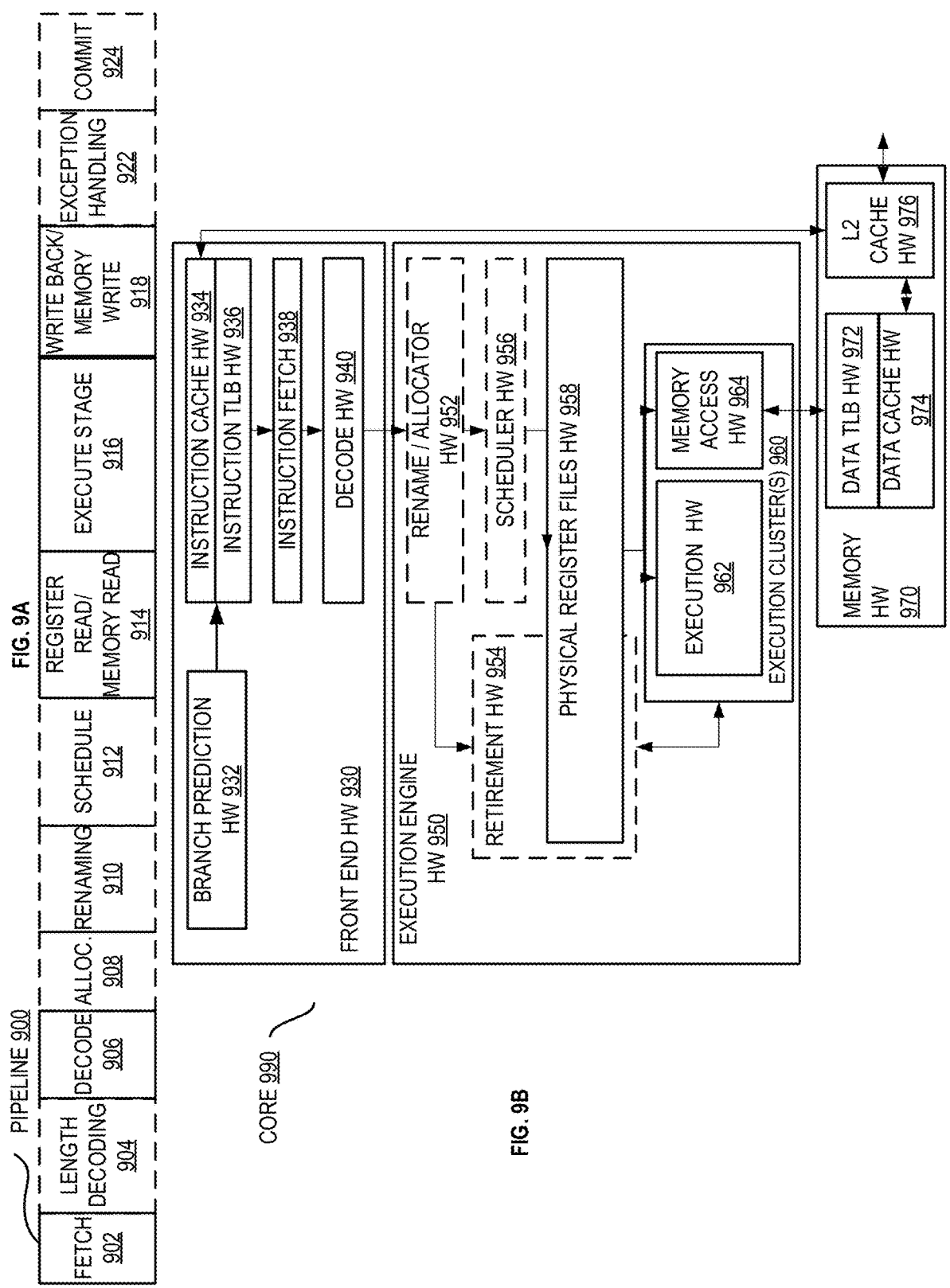
FIG. 9A is a block diagram illustrating both an exemplary in-order pipeline and an exemplary register renaming, out-of-order issue/execution pipeline according to embodiments of the invention.
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end hardware 930 coupled to an execution engine hardware 950, and both are coupled to a memory hardware 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end hardware 930 includes a branch prediction hardware 932 coupled to an instruction cache hardware 934, which is coupled to an instruction translation lookaside buffer (TLB) 936, which is coupled to an instruction fetch hardware 938, which is coupled to a decode hardware 940. The decode hardware 940 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode hardware 940 or otherwise within the front end hardware 930). The decode hardware 940 is coupled to a rename/allocator hardware 952 in the execution engine hardware 950.

The execution engine hardware 950 includes the rename/allocator hardware 952 coupled to a retirement hardware 954 and a set of one or more scheduler hardware 956. The scheduler hardware 956 represents any number of different schedulers, including reservations stations, central instruction window, etc. The scheduler hardware 956 is coupled to the physical register file(s) hardware 958. Each of the physical register file(s) hardware 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 958 comprises a vector registers hardware, a write mask registers hardware, and a scalar registers hardware. These register hardware may provide architectural vector registers, vector mask registers, and general purpose registers. The physical register file(s) hardware 958 is overlapped by the retirement hardware 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 954 and the physical register file(s) hardware 958 are coupled to the execution cluster(s) 960. The execution cluster(s) 960 includes a set of one or more execution hardware 962 and a set of one or more memory access hardware 964. The execution hardware 962 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 956, physical register file(s) hardware 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 964). It should also be understood that where separate pipelines are used, one or more of these pipelines may be out-of-order issue/execution and the rest in-order.

The set of memory access hardware 964 is coupled to the memory hardware 970, which includes a data TLB hardware 972 coupled to a data cache hardware 974 coupled to a level 2 (L2) cache hardware 976. In one exemplary embodiment, the memory access hardware 964 may include a load hardware, a store address hardware, and a store data hardware, each of which is coupled to the data TLB hardware 972 in the memory hardware 970. The instruction cache hardware 934 is further coupled to a level 2 (L2) cache hardware 976 in the memory hardware 970. The L2 cache hardware 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode hardware 940 performs the decode stage 906; 3) the rename/allocator hardware 952 performs the allocation stage 908 and renaming stage 910; 4) the scheduler hardware 956 performs the schedule stage 912; 5) the physical register file(s) hardware 958 and the memory hardware 970 perform the register read/memory read stage 914; the execution cluster 960 perform the execute stage 916; 6) the memory hardware 970 and the physical register file(s) hardware 958 perform the write back/memory write stage 918; 7) various hardware may be involved in the exception handling stage 922; and 8) the retirement hardware 954 and the physical register file(s) hardware 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 934/974 and a shared L2 cache hardware 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10:
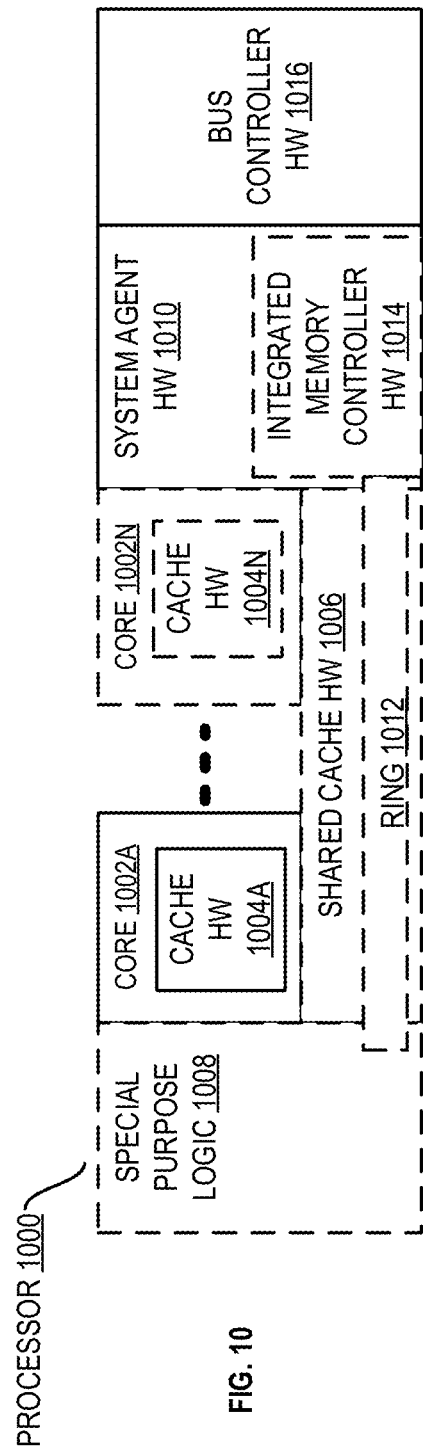
FIG. 10 is a block diagram of a single core processor and a multicore processor with integrated memory controller and graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller hardware 1016, while the optional addition of the dashed lined boxes illustrates an alternative processor 1000 with multiple cores 1002A-N, a set of one or more integrated memory controller hardware 1014 in the system agent hardware 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1006, and external memory (not shown) coupled to the set of integrated memory controller hardware 1014. The set of shared cache hardware 1006 may include one or more mid-level caches, such as level 2 (L2), level 3 (L3), level 4 (L4), or other levels of cache, a last level cache (LLC), and/or combinations thereof. While in one embodiment a ring based interconnect hardware 1012 interconnects the integrated graphics logic 1008, the set of shared cache hardware 1006, and the system agent hardware 1010/integrated memory controller hardware 1014, alternative embodiments may use any number of well-known techniques for interconnecting such hardware. In one embodiment, coherency is maintained between one or more cache hardware 1006 and cores 1002-A-N.

In some embodiments, one or more of the cores 1002A-N are capable of multi-threading. The system agent 1010 includes those components coordinating and operating cores 1002A-N. The system agent hardware 1010 may include for example a power control unit (PCU) and a display hardware. The PCU may be or include logic and components needed for regulating the power state of the cores 1002A-N and the integrated graphics logic 1008. The display hardware is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set. In one embodiment, the cores 1002A-N are heterogeneous and include both the "small" cores and "big" cores described below.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
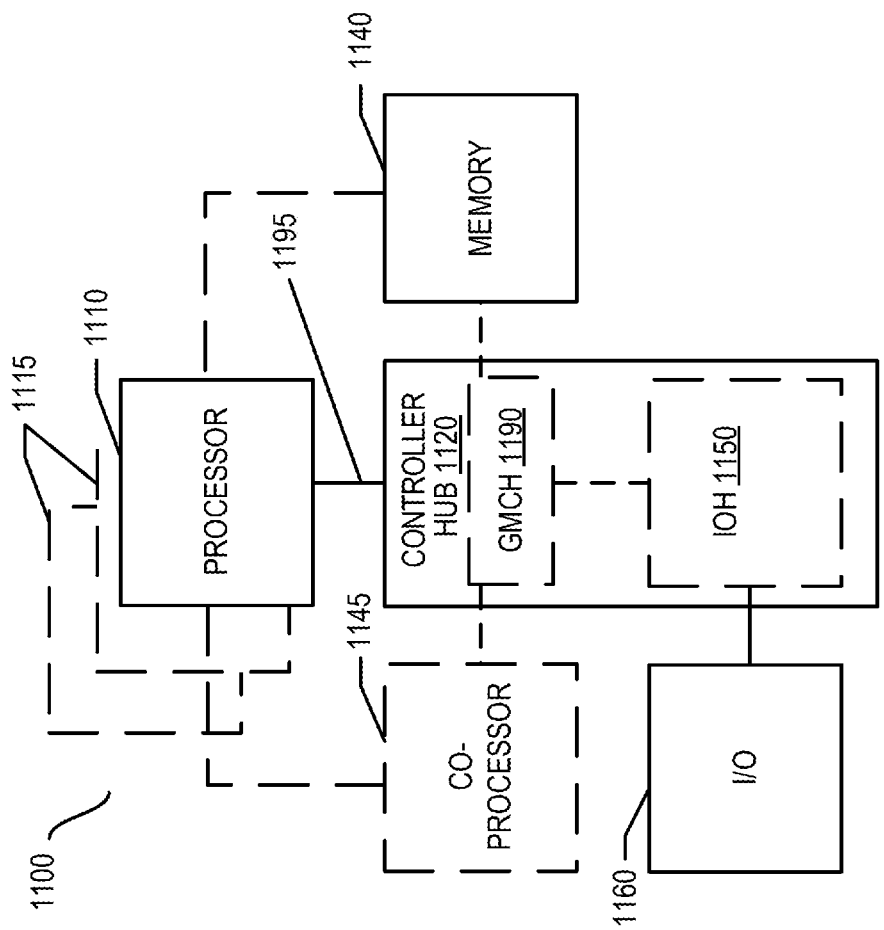
FIG. 11 illustrates a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/0) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface, or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
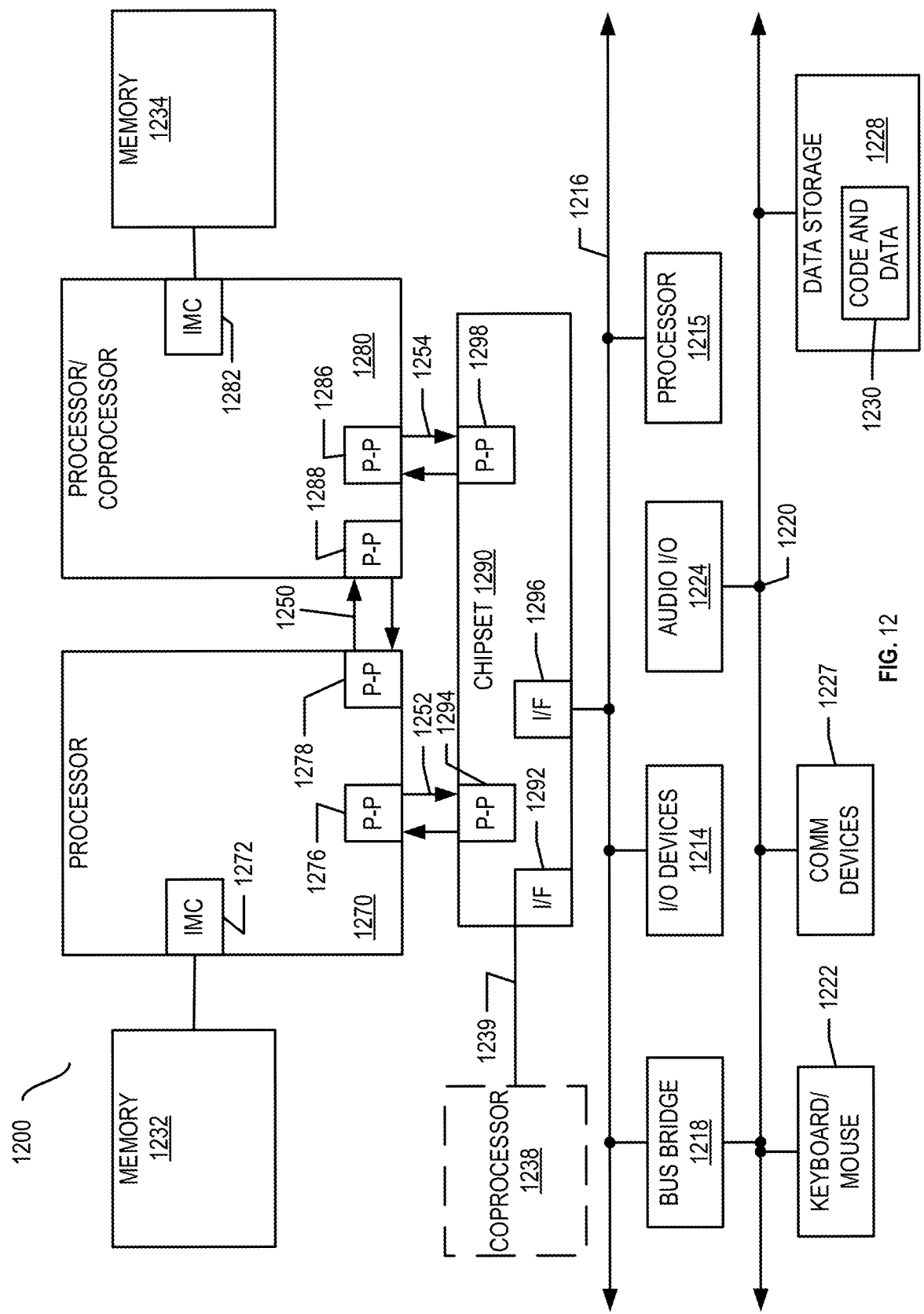
FIG. 12 illustrates a block diagram of a second system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) hardware 1272 and 1282, respectively. Processor 1270 also includes as part of its bus controller hardware point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) hardware), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage hardware 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
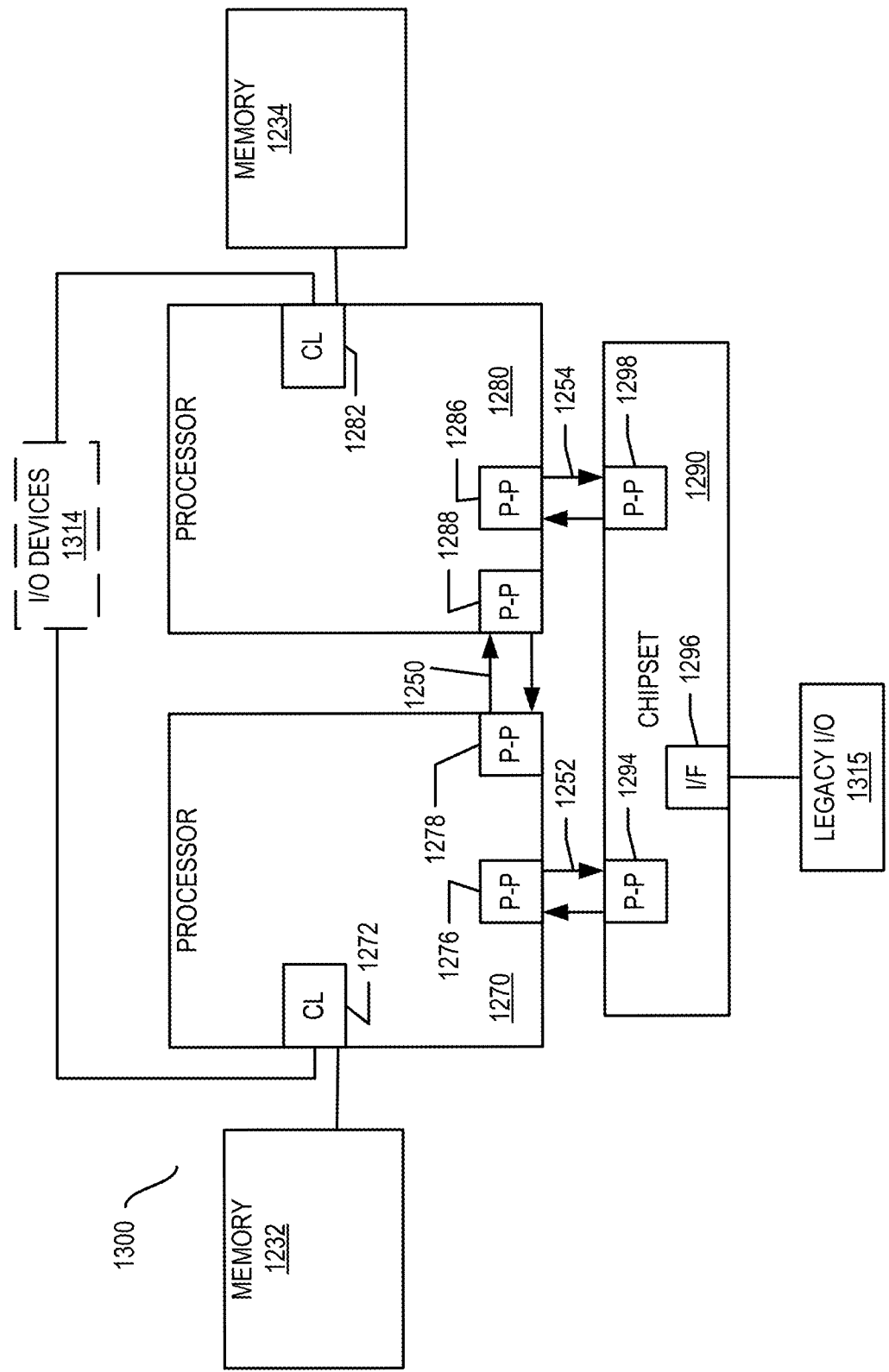
FIG. 13 illustrates a block diagram of a third system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller hardware and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
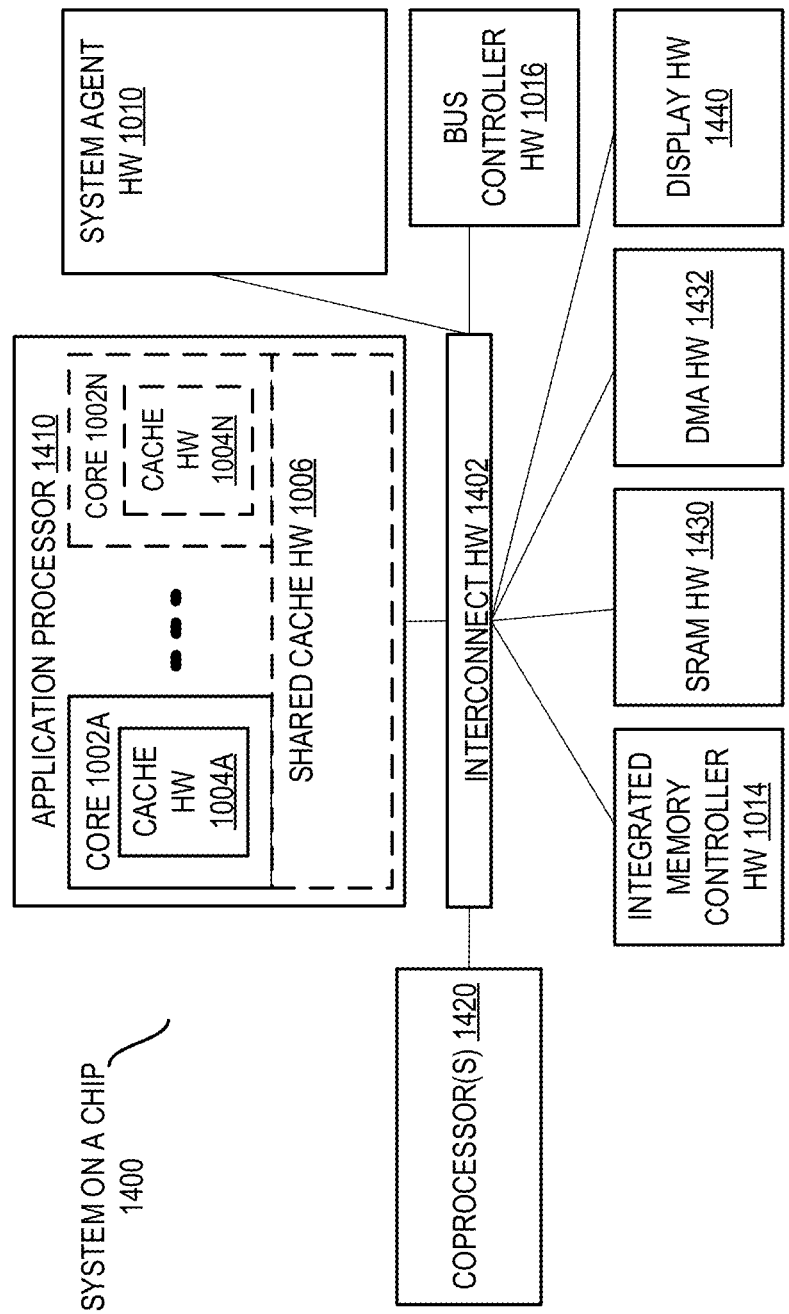
FIG. 14 illustrates a block diagram of a system on a chip (SoC) in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect hardware 1402 is coupled to: an application processor 1410 which includes a set of one or more cores 1002A-N and shared cache hardware 1006; a system agent hardware 1010; a bus controller hardware 1016; an integrated memory controller hardware 1014; a set or one or more coprocessors 1420 which may include integrated graphics logic, an image processor, an audio processor, and a video processor; an static random access memory (SRAM) hardware 1430; a direct memory access (DMA) hardware 1432; and a display hardware 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
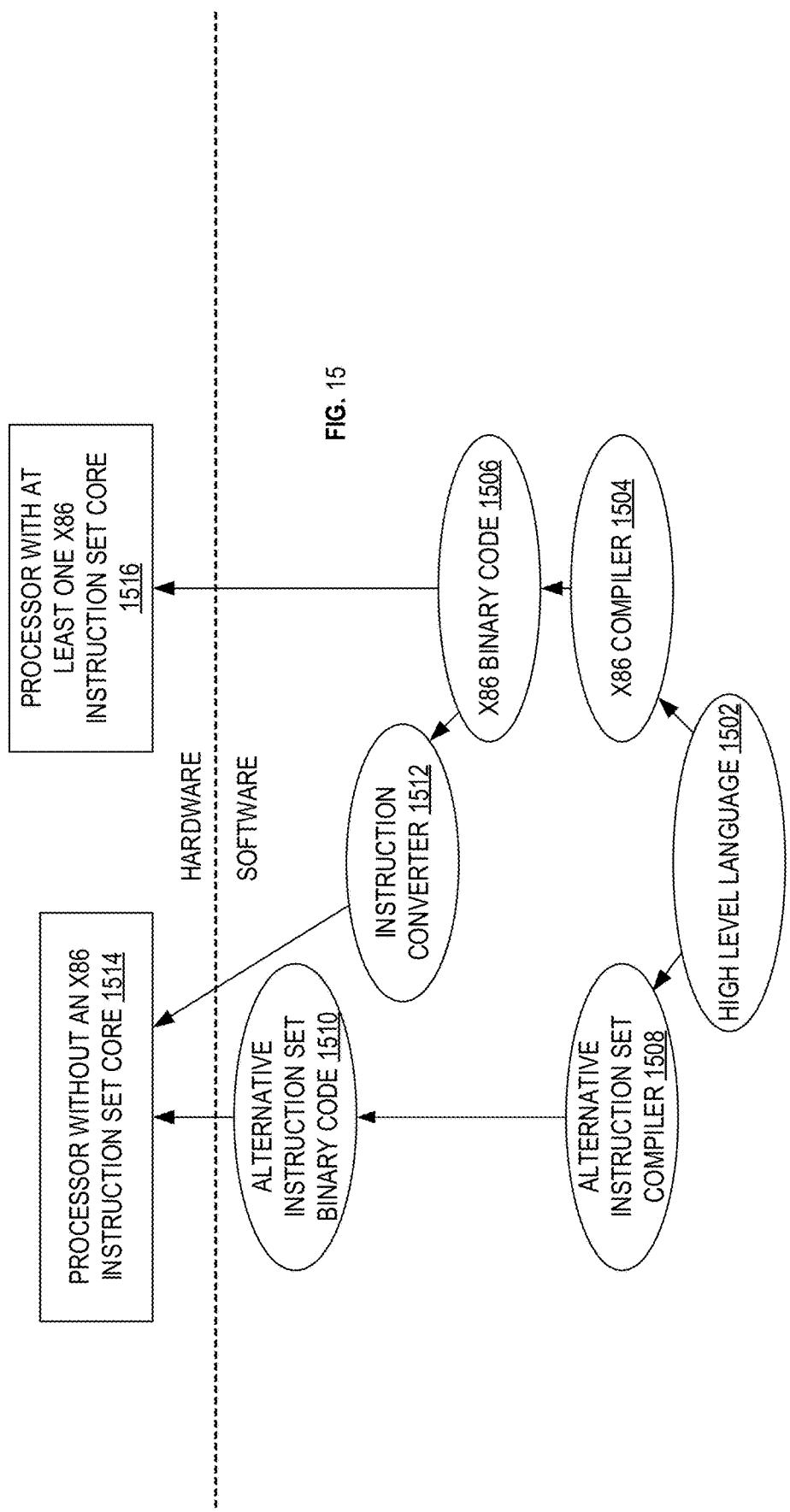
FIG. 15 illustrates a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising:
a memory to store instructions;
a processing circuitry to execute instructions; and
an interface circuitry to
provide metrics associated with the apparatus to one or more subscriber nodes or network components in a managed cluster, each metric to be associated with a time stamp to indicate when the associated metric was first generated and a flag to indicate whether the associated metric should be preprocessed by a receiving subscriber node or network component subscribe, via a metrics subscription request, to receive from one or more publisher nodes or network components in the managed cluster, metrics associated with the one or more publisher nodes or network components, the metrics to be stored in a dedicated location of the memory via direct memory access (DMA);

receive, from a directory and topology service, a catalog of all available metrics published by the one or more publisher nodes or network components in the managed cluster; and receive, from the directory and topology service, a network topology of the managed cluster.

2. The apparatus of claim 1, wherein provision and subscription of metrics are made using new protocols added to Layer 4 or transport layer of a network communication model.

3. The apparatus of claim 1, wherein provision and subscription of metrics are made over a dedicated communication channel.

4. The apparatus of claim 3, wherein the dedicated communication channel is of low bandwidth with fixed priority and deterministic latency.

5. The apparatus of claim 3, wherein the dedicated communication channel is a virtual channel.

6. The apparatus of claim 3, wherein the dedicated communication channel is a physical channel.

7. The apparatus of claim 1, wherein the metrics stored in the dedicated location of the memory are accessible by operating system or software running on the apparatus through a read to the memory.

8. The apparatus of claim 1, wherein the metrics associated with the apparatus is provided through a multicast message.

9. The apparatus of claim 1, wherein the interface circuitry further to publish to a central metrics map service a list of metrics associated with the apparatus.

10. a method comprising:
providing metrics associated with a publishing node or network component to one or more subscriber nodes or network components in a managed cluster, each metric to be associated with a time stamp to indicate when the associated metric was first generated and a flag to indicate whether the associated metric should be preprocessed by a receiving subscriber node or network component subscribing, via a metrics subscription request, to receive from one or more publisher nodes or network components in the managed cluster, metrics associated with the one or more publisher nodes or network components;

storing the received metrics in a dedicated location of a memory via direct memory access (DMA);

receiving, from a directory and topology service, a catalog of all available metrics published by the one or more publisher nodes or network components in the managed cluster; and receiving, from the directory and topology service, a network topology of the managed cluster.

11. The method of claim 10, wherein the providing and the subscribing of metrics are made using new protocols added to Layer 4 or transport layer of a network communication model.

12. The method of claim 10, wherein the providing and the subscribing of metrics are made over a dedicated communication channel.

13. The method of claim 12, wherein the dedicated communication channel is of low bandwidth with fixed priority and deterministic latency.

14. The method of claim 12, wherein the dedicated communication channel is a virtual channel.

15. The method of claim 12, wherein the dedicated communication channel is a physical channel.

16. The method of claim 10, further comprises accessing the received metrics through a reading of the dedicated location in the memory.

17. The method of claim 10, further comprises providing the metrics associated with the publishing node through a multicast message.

18. The method of claim 10, further comprises publishing to a central metrics map service a list of metrics associated with the publishing node.

19. A system of a plurality of nodes and network components, the system comprising:
a publishing node or network component to provide to one or more subscriber nodes or network components in the system, metrics associated with the publishing node or network component, each metric to be associated with a time stamp to indicate when the associated metric was first generated and a flag to indicate whether the associated metric should be preprocessed by a receiving subscriber node or network component a subscribing node or network component to subscribe, via a metrics subscription request, to receive from one or more publisher nodes or network components in the system, metrics associated with the one or more publisher nodes or network components, the metrics to be stored in a dedicated memory location in the subscribing node or network component via direct memory access (DMA); and a directory and topology service to build a catalog of all available metrics published by the plurality of nodes and network components in the system, the directory and topology service further to record network topology of the plurality of nodes and network components in the system and to supply the recorded network topology to the plurality of nodes and network components in the system.

20. The system of claim 19, wherein provision and subscription of metrics are made using new protocols added to Layer 4 or transport layer of a network communication model.

21. The system of claim 19, wherein provision and subscription to metrics are made over a dedicated communication channel.

22. The system of claim 21, wherein the dedicated communication channel is of low bandwidth with fixed priority and deterministic latency.

* * * * *